United States Patent [19]

Beg et al.

[11] Patent Number: 4,688,095
[45] Date of Patent: Aug. 18, 1987

[54] PROGRAMMABLE IMAGE-TRANSFORMATION SYSTEM

[75] Inventors: Mirza R. Beg, Andover; Julius Perl, Burlington; Ronald D. Malcolm, Jr., Haverhill, all of Mass.

[73] Assignee: Image Technology Incorporated, Woburn, Mass.

[21] Appl. No.: 827,155

[22] Filed: Feb. 7, 1986

[51] Int. Cl.⁴ ............................................. H04N 5/14
[52] U.S. Cl. .................................... 358/160; 358/166
[58] Field of Search ................ 358/160, 21 R, 167, 358/166, 164, 36, 37, 32, 163, 284, 282, 112; 364/514, 515, 516; 367/11

[56] References Cited

U.S. PATENT DOCUMENTS

| | | | |
|---|---|---|---|
| 3,800,078 | 3/1974 | Cochran et al. | 358/213 |
| 4,148,070 | 4/1979 | Taylor | 358/160 |
| 4,212,072 | 7/1980 | Huelsman et al. | 364/515 |
| 4,285,004 | 8/1981 | Morrison et al. | 358/10 |
| 4,365,304 | 12/1982 | Ruhman et al. | 364/515 |
| 4,375,671 | 3/1983 | Engle | 358/166 X |
| 4,394,688 | 7/1983 | Iida et al. | 358/160 |
| 4,396,938 | 8/1983 | Dischert | 358/21 R |
| 4,435,792 | 3/1984 | Bechtolsheim | 358/166 X |
| 4,445,138 | 4/1984 | Zwirn et al. | 358/166 |
| 4,450,482 | 5/1984 | Ackermann | 358/160 |

FOREIGN PATENT DOCUMENTS 2109135 5/1983 United Kingdom ................ 358/160

OTHER PUBLICATIONS

"A Digital Telecine Processing Channel" by Olifant et al, SMPTE Journal, vol. 88, No. 7, 7/79.

Primary Examiner—Tommy P. Chin
Assistant Examiner—David E. Harvey
Attorney, Agent, or Firm—Cesari and McKenna

[57] ABSTRACT

Data to be stored in a frame buffer (12) that stores data representing an image are drawn from a look-up table (34). The look-up table (34) contains conversion data and is addressed by the output of a multiplexer circuit (24). The multiplexer circuit (24) receives its inputs from the data output port of the frame buffer (12), from a register (42), and from an analog-to-digital converter (22) that converts the output of a video camera (20) to digital signals. In response to different values on selection-signal lines (36), the multiplexer circuit (24) assembles the address that it applies to the look-up table (34) from different combinations of the outputs of the frame buffer (12), the register (42), and the analog-to-digital-converter (22). By changing the selection signals applied to the multiplexer circuit (24), it is possible to employ the same image-processing system (10) to perform different functions, such as gamma correction, contrast variation, iamge-from-image subtraction, and multiple-image averaging.

8 Claims, 1 Drawing Figure

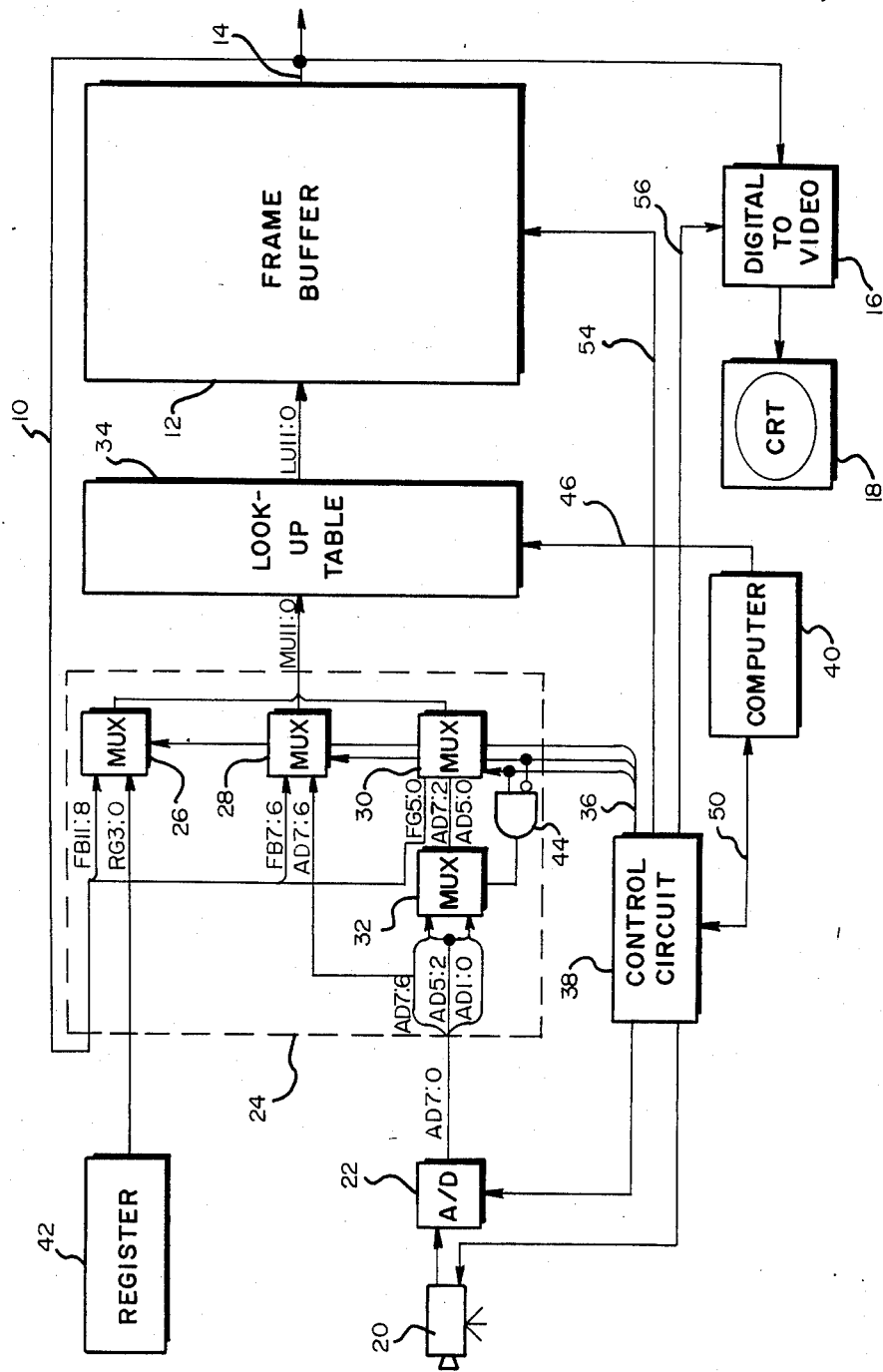

PROGRAMMABLE IMAGE-TRANSFORMATION SYSTEM

BACKGROUND OF THE INVENTION

The present invention is directed to image-processing systems, particularly those in which updated image values are generated as functions both of previous values and of new data.

In many image-processing systems, the raw data must be subjected to various types of transformations. Some of the transformations depend only on the values of the current input signals. For instance, some image processing involves so-called gamma correction, which compensates for the non-linear relationship between a camera output and the intensities to which the camera responds. Other forms of transformation depend not only on the data currently being obtained but also on the data previously stored. For instance, systems for detecting changes in an image may subtract current pixel (picture-element) values from stored pixel values to detect movement in the image. Another example of processing that uses both stored data and newly generated data is noise reduction by averaging over a plurality of successive scans of an image. These separate functions are commonly provided by separate specialized circuits or by generalized arithmetic logic units. Both of these approaches can be relatively expensive, and the time that it takes a generalized arithmetic logic unit to perform certain real-time applications may be prohibitive.

An object of the present invention is to provide a variety of image-processing features in fast and relatively simple and inexpensive circuitry.

SUMMARY OF THE INVENTION

The foregoing and related objects are achieved in an image-processing system in which a multiplexer supplies address signals to a look-up table whose resulting output is applied as data to a frame buffer. The frame buffer is a memory having a plurality of memory locations, each of which is associated with a different pixel in an image. The multiplexer selects the bits of the address signals from bits of output data signals of the frame buffer and from output data signals of an image-signal source, such as an analog-to-digital converter that converts the output of a video camera to digital values. By changing selection signals applied to the multiplexer, it is possible to use this same system alternately for transformations dependent only on newly generated data, transformations dependent only on stored data, and transformations dependent on both.

BRIEF DESCRIPTION OF THE DRAWING

These and further features of the present invention are described in connection with the accompanying drawing figure, which is a simplified block diagram of an image-processing system employing the teachings of the present invention.

DETAILED DESCRIPTION OF THE PREFERRED EMBODIMENT

The drawing depicts an image-processing system 10 for performing any one of several operations on images processed in the form of digital words representing information concerning individual picture elements ("pixels") of an image. The image is stored in a frame buffer 12. In the illustrated embodiment, the frame buffer is organized in 512 rows and 512 columns of locations, each of which contains a 12-bit data word. Each of the locations is associated with a separate pixel.

It should be understood that the association between pixels and memory locations may well be dynamic; the frame buffer typically is being rewritten continually, and the pixel with which a location is associated during one scan through the memory may be different from that with which it is associated in a subsequent scan.

The data output bus 14 of the frame buffer 12 in this embodiment consists of twelve parallel lines carrying, at any given time, signals representing the twelve-bit contents of a single frame-buffer location. A typical use of the data output of the frame buffer 12 is transmission to a digital-to-video converter 16 for presentation on a cathode-ray tube 18. However, there are many uses for images that do not require presentation to a human operator, so the system of the present invention is not restricted to systems having cathode-ray tubes or similar display devices for human use.

The ultimate source of the images stored in the frame buffer 12 is typically some type of transducer such as a video camera 20, whose analog output is converted into digital form by an analog-to-digital converter 22. Another typical source is a second frame buffer.

In the illustrated embodiment, the analog-to-digital converter 22 has eight bits of resolution, producing eight parallel bits AD7:0. These analog-to-digital-converter data are applied to a multiplexer circuit 24 that includes four individual multiplexers 26, 28, 30, and 32. The purpose of the multiplexer circuit 24 is to generate an address signal MU11:0 for application to a look-up table 34. The look-up table 34 is typically a random-access read/write memory although it can in principle be a read-only memory.

The manner in which the multiplexer circuit 24 generates the address signals for the look-up table 34 is determined by signals on control lines 36 from a control circuit 38. The control circuit 38 in turn operates under directions from a host computer 40.

Clearly, the look-up table 34 has more locations than are required by the resolution of the analog-to-digital converter 22. Specifically, there are 256 possible output values of the analog-to-digital converter 22, while there are 4,096 locations in the look-up table 34; i.e., there are 16 times as many look-up-table locations as there are possible analog-to-digital-converter output values. This makes it possible to store, for instance, different correction functions for each of sixteen different combinations of camera and display device. The computer 40 initially writes the sixteen correction functions into the look-up table 34 and deposits a code designating the desired correction function into a register 42, which is the third source from which the multiplexer circuit 24 draws signals in the illustrated embodiment. Of course, combinations of sources different from the three in the illustrated embodiment may be used in other versions of the present invention.

The signals on lines 36 select sources for the bits of the look-up-table address MU11:0 by selecting one of two states of each of the multiplexers 26, 28, 30, and 32. Through the operation of an AND gate 44, the state of multiplexer 32 depends on the states of multiplexers 28 and 30. As a consequence, there are eight possible states of multiplexer circuit 24. In the illustrated embodiment, however, only six of these states are intended to be used.

In the first state, multiplexer 26 forwards the register output RG3:0, multiplexer 28 forwards the two most-significant bits AD7:6 of the analog-to-digital-converter output, and multiplexer 30 forwards the output of multiplexer 32, which output is the remaining analog-to-digital-converter output bits AD5:0. Thus, the address signals sent to the look-up table 34 consist of the four register bits and the eight analog-to-digital-converter output bits.

In this multiplexer setting, the system 10 may, for instance, be used for gamma correction, in which the value to be stored is typically a fractional power of the value represented by the analog-to-digital-converter output AD7:0. A given value from the analog-to-digital-converter 22 causes the multiplexer 24 to designate a location in the look-up table 34 having an address of which eight bits represent that analog-to-digital-converter value and the other four bits designate one of sixteen possible values of gamma, the fractional power for the intended gamma correction. The contents of the look-up table 34 at that location are equal to the analog-to-digital-converter output value raised to gamma, so the value that the look-up table 34 sends to the frame buffer 12 is not the raw output of the analog-to-digital converter 22; it is a transformed output.

In the second mode, the multiplexer circuit 24 supplies as address bits to the look-up table 34 the twelve-bit output of the frame buffer 12; multiplexer 26 forwards the four most-significant bits FB11:8 of the frame-buffer output, multiplexer 28 forwards the next two bits FB7:6, and multiplexer 30 forwards the remaining bits FB5:0. This mode can be used for a number of different functions, such as arithmetic or logic processing, window processing, and other types of image transformations.

It should be noted that this mode in particular permits operations on data whose intensity resolution is high. In the first mode, in which the data source is the analog-to-digital-converter 22, the input data has only eight bits of intensity resolution, so only eight bits of the look-up table contents would typically be significant; the other bits generated by the look-up table 34 and stored in the frame buffer 12 would not represent part of a pixel value. In this second mode, however, the contents of the frame buffer 12 could be obtained from some other, high-resolution source, so the entire contents of the frame buffer 12 could represent a pixel value.

The third mode of operation is similar to the first except that the analog-to-digital-converter output is replaced by eight bits of the frame-buffer output. Specifically, multiplexer 26 forwards the register bits RG3:0, while multiplexers 28 and 30 together forward eight bits FB7:0 of the frame-buffer output.

It should be noted that the frame-buffer bits FB7:0 were not referred to as the eight least-significant bits. This is because the higher-numbered bits FB11:8 would not typically contain bits of a pixel-value representation in this mode. Thus, the entire pixel value would be contained in bits FB7:0.

This mode can be used for any type of application in which it is desired to transform a previously stored image in accordance with one of several possible transformation functions. It may be desired, for instance, to transform stored raw data into a form best suited to one of a number of different display devices. The particular display device currently in use, and thus the choice of transform function, is designated by the output of the register 42. Or an operator may cause the control circuit repeatedly to deposit different contents into the register 42 in order to find the most-satisfactory display.

In the fourth mode, half of the address bits are drawn from the analog-to-digital converter 22 and half are drawn from the frame buffer 12. Specifically, multiplexers 26 and 28 forward six frame-buffer output bits FB11:6, while multiplexer 30 forwards the output of multiplexer 32. In this mode, the output of multiplexer 32 is analog-to-digital-converter output bits AD7:2 rather than AD5:0. The pixel values are stored in the halves of the frame-buffer locations that produce output bits FB11:6, while it is the other halves of the locations, those that result in FB5:0, that contain nonpixel-value information.

This mode has a wide variety of uses. It may be used for subtraction—i.e., to subtract the pixel value of one frame from the corresponding pixel value of the subsequent or previous frame. For this purpose, the contents of each look-up-table location would equal the difference between the value represented by one half of its address bits and the value represented by the other half of its address bits. Another possible use of this mode is to reduce noise by exponential averaging. For exponential averaging, the contents of a look-up-table location might be equal to, say, seven-eighths of the value represented by the frame-buffer portion of its address plus one-eighth of the value represented by the analog-to-digital-converter part of its address.

In the fifth mode, four bits of the address come from the frame buffer 12, while the remaining eight come from the analog-to-digital converter 22. Specifically, multiplexer 26 forwards frame-buffer bits FB11:8 while multiplexers 28 and 30 forward analog-to-digital-converter output bits AD7:0.

This mode might be used for selective conversion in accordance with the position of the pixel in the image. The image might be divided into regions, for example, and the frame-buffer bits in each frame-buffer location corresponding to output bits FB11:8 might, instead of being part of a pixel value, identify the region to which the corresponding pixel belongs. The conversion function for the outputs of the analog-to-digital converter 22 would differ in accordance with the region to which the pixel belongs. For such an application, four look-up-table bits in each location corresponding to look-up-table output bits LU11:8 would be equal to four bits MU11:8 of its address so that the region information rewritten into the frame buffer would equal the region information read from it. The remaining bits of each location in the look-up table 34, i.e., those corresponding to its output bits LU7:0, would represent the transformation of the value represented by its address bits MU7:0 in accordance with the function designated by its other address bits MU11:8.

In the final mode, the multiplexer circuit 24 draws the address bits MU11:0 from all three sources: the frame buffer 12, the analog-to-digital converter 22, and the register 42. Multiplexer 26 forwards the four register bits RG3:0, multiplexer 28 forwards two of the frame-buffer bits FB7:6, and multiplexer 30 forwards the output of multiplexer 32, which in turn forwards the five most-significant bits AD7:2 of the analog-to-digital-converter output.

Like the fifth mode, the sixth mode is typically used to implement a region-dependent transform. Specifically, bits six and seven of the contents of each frame-buffer location would designate the one region to which that location belongs out of four possible regions in the image, while bits five through zero would contain the pixel value. The remaining bits typically would not contain meaningful information. The register bits RG3:0 would designate the one of sixteen possible combinations of four transform functions to be used. Thus, for each location in the look-up table 34, the contents of bits seven and six would be equal to bits seven and six of its address, while bits five through zero would equal the transform of the value represented by its address bits five through zero in accordance with the one transform function designated by its address bits seven and six out of the four-transform-function combination designated by its address bits eleven through eight.

In operation, the computer 40 loads the look-up table 34 in accordance with the function to be performed. If necessary, the computer also places signals on lines 48 to load a value into register 42 that designates the portion of the look-up table 34 to be used. The computer 40 then sends appropriate control signals over lines 50 to the control circuit 38 to cause it to begin operation.

The control circuit 38 sends synchronizing signals over lines 52 to the camera 20 and clocks the analog-to-digital converter 22 to convert the video signals into pixel values. At the same time, it sends address and control signals over lines 54 to the frame buffer 12 so that the frame buffer generates data signals representing the location associated with the pixel for which the analog-to-digital-converter 22 is currently generating a pixel value. As a result, the frame-buffer output signals, together with the signals presented by the register 42, are applied to the multiplexer circuit 24 at the same time as the output of the analog-to-digital converter 22 is so that the bits that the multiplexer circuit 24 draws from the different sources represent the same pixel.

The control circuit 38 applies selection signals over lines 36 to the multiplexer circuit 24 to indicate the proper selection of bits for the look-up-table address. The multiplexer circuit 24 accordingly applies the desired address to the look-up table 34, and the control circuit 38 applies control signals to lines 56 that cause the look-up table 34 to generate signals LU11:0 representing the contents of the addressed look-up-table location.

At this point, the control circuit 38 sends control signals and address signals representing the location associated with that pixel over lines 54 to the frame buffer 12 to cause it to read the look-up-table contents into the addressed location.

Those skilled in the art will recognize that the pixel values are generated at a rapid rate. As a consequence, the operation just described in a simplified way is actually performed in a pipelined manner. That is, between the time at which data for a given pixel are initially produced by the frame buffer 12 and the analog-to-digital-converter 22 and the time when the results of those data are written into the frame-buffer 12, data for several subsequent pixels will have been generated and the resulting signals will have begun to propagate through the stages just described. Accordingly, data for a given pixel are read from the frame buffer 12 at approximately the same time as that at which data for another pixel several locations removed from the first pixel are being written into the frame buffer 12.

If the image is to be monitored by the user while the processing occurs, the control circuit also sends control signals over lines 56 to synchronize the digital-to-video converter 16 with the frame-buffer reading operation so that the image is displayed properly on the cathode-ray tube 18.

In order to change the function performed by the image-processing system 10, the computer 40 performs one or more of three operations. The computer 40 may load the register 42 with new contents. It may cause the control circuit 38 to change the selection signals on line 36 so that the multiplexer circuit 24 assembles the look-up-table addresses in the newly desired manner. And it may load the look-up table 34 with new contents. It then initiates operation of the control circuit 40, and the image-processing circuitry 10 now performs a different function.

It is thus clear that, by practicing the invention described above, those skilled in the art can achieve a great degree of versatility with a minimum of processing hardware. The present invention thus constitutes a significant advance in the art.

What is claimed as new and desired to be secured by Letters Patent of the United States is:

1. An image-processing system comprising:
A. an image-signal source for generating digital source signals representing the intensities of source picture elements disposed in different locations in a source image;
B. a frame buffer, adapted for application thereto of data signals that represent data to be stored and including a plurality of frame-buffer locations corresponding to buffer picture elements disposed in different locations in a buffer image, for storing in the frame-buffer locations as pixel storage data the data represented by the data signals applied thereto, the frame buffer generating digital buffer signals representing the contents of the pixel storage data contained in the frame-buffer locations;
C. a conversion memory, including a plurality of addressable conversion-memory locations containing conversion data as contents thereof, and adapted for application thereto of address signals designating given conversion-memory locations, for applying to the frame buffer, as data signals, conversion signals representing the contents of the conversion-memory location addressed by the address signals applied thereto;
D. a multiplexer, connected to receive the source signals and the buffer signals and adapted for application thereto of selection signals that can assume different values that specify different combinations of bits of the received source and buffer signals, for forwarding to the conversion memory as the address signals, in accordance with different values of the selection signals, the combination of bits of the received source and buffer signals that the selection signals specify; and
E. a control circuit for synchronizing operation of the image-signal source and the frame buffer so that the locations in the source and buffer images of the source and buffer picture elements, respectively, whose intensities are represented by the source and buffer signals, respectively, whose bits the multiplexer forwards as address signals to the conversion memory to designate a memory location whose contents are represented by given conversion signals are the same as the location in the buffer image of the buffer picture element corresponding to the frame-buffer location in which the frame buffer stores the data represented by the given conversion signals, whereby the multiplexer and conversion memory together establish a correspondence between conversion signals and combinations of source and buffer signals that can be changed by changing the values of the selection signals applied to the multiplexer.

2. An image-processing system as defined in claim 1 wherein:
   A. the image-processing system further comprises a register, containing register data, for applying digital register signals to the multiplexer that represent the register data; and
   B. the multiplexer is operable by application of the selection signals thereto to forward to the conversion memory as address signals a combination of bits including bits of the register signals.

3. An image-processing system as defined in claim 2 wherein, in response to at least one selection-signal value, the multiplexer forwards at least one bit from each of the register, source, and buffer signals.

4. An image-processing system as defined in claim 3 wherein, in response to at least one selection-signal value, the multiplexer forwards at least one bit of the register signal and at least one bit of only one of the source and buffer signals.

5. An image-processing system as defined in claim 1 wherein the image-signal source comprises:
   A. a video camera for converting light from an image into video signals representing the image; and
   B. an analog-to-digital converter, connected to receive the video signals, for converting the video signals into digital signals and transmitting the digital signals to the multiplexer as the source signals from the image-signal source.

6. An image-processing system as defined in claim 1 wherein the conversion memory is a read/write memory.

7. An image-processing system as defined in claim 1 wherein, in response to at least one selection-signal value, the multiplexer forwards at least one bit of each of the source and buffer signals.

8. An image-processing system as defined in claim 1 wherein, in response to at least one selection-signal value, the multiplexer forwards only bits of the buffer signal.

* * * * *